(12) United States Patent
Friedsam et al.

(10) Patent No.: US 10,620,381 B2
(45) Date of Patent: Apr. 14, 2020

(54) OPTICAL ROTARY JOINT, METHOD FOR OPTICAL SIGNAL TRANSMISSION AND USE OF THE OPTICAL ROTARY JOINT

(71) Applicant: Spinner GmbH, Feldkirchen-Westerhan (DE)

(72) Inventors: Gerhard Friedsam, Feldkirchen (DE); Rupert Huber, Schechen (DE)

(73) Assignee: Spinner GmbH, Feldkirchen-Westerhan (DE)

( * ) Notice: Subject to any disclaimer, the term of this patent is extended or adjusted under 35 U.S.C. 154(b) by 0 days.

(21) Appl. No.: 16/308,845

(22) PCT Filed: Jun. 26, 2017

(86) PCT No.: PCT/EP2017/065621
§ 371 (c)(1),
(2) Date: Dec. 11, 2018

(87) PCT Pub. No.: WO2018/001922
PCT Pub. Date: Jan. 4, 2018

(65) Prior Publication Data
US 2019/0310427 A1      Oct. 10, 2019

(30) Foreign Application Priority Data
Jun. 27, 2016   (DE) .................. 10 2016 211 475

(51) Int. Cl.
*G02B 6/26*      (2006.01)
*G02B 6/36*      (2006.01)

(52) U.S. Cl.
CPC .......... *G02B 6/3604* (2013.01); *G02B 6/3628* (2013.01)

(58) Field of Classification Search
CPC ............................ G02B 6/3604; G02B 6/3628
See application file for complete search history.

(56) References Cited

U.S. PATENT DOCUMENTS 3,573,471 A * 4/1971 Kolb .................. H03M 1/00
                                                              250/568
3,924,122 A * 12/1975 Russell .............. A63B 67/02
                                                              250/236
(Continued)

FOREIGN PATENT DOCUMENTS

DE    10 2006 054 052 A1    5/2008
DE    10 2010 036 174 A1    11/2011
(Continued)

OTHER PUBLICATIONS

International Search Report for PCT/EP2017/065621, dated Sep. 6, 2017; English translation submitted herewith (5 pgs.).

*Primary Examiner* — Ellen E Kim
(74) *Attorney, Agent, or Firm* — Fitch, Even, Tabin & Flannery LLP (57) ABSTRACT

An optical rotary joint for optical signal transmission is described, said optical rotary joint having at least two units that are respectively rotatably mounted about an axis of rotation, the axes of rotation of which, at least in sections, have a lateral distance from one another. The invention is distinguished by a rotary transformer that is embodied in the form of an endless loop respectively resting in a circumferential manner on both units along a contact region and positively coupling the at least two units with one another in a rotationally movable manner. Attached to both units is respectively one optical unit for conjoint rotation, said optical unit comprising at least one optical signal line, a beam splitter and/or beam coupler, which is optically coupled to the at least one optical signal line, and at least two optical partial signal lines, said optical unit being optically coupled to the at least one optical signal line via the beam splitter and/or beam coupler. Moreover, at least two optical transmission lines are attached to the rotary transformer. Finally, optical coupling means are attached to the rotary (Continued)

transformer and optical coupling means are attached to the units, which respectively serve for detachable optical signal coupling between one of the partial signal lines and one of the optical transmission lines.

12 Claims, 3 Drawing Sheets

(56) References Cited

U.S. PATENT DOCUMENTS

| | | |
|---|---|---|
| 4,027,945 A | 6/1977 | Iverson |
| 4,711,516 A | 12/1987 | Graber |
| 4,943,137 A | 7/1990 | Speer |
| 4,982,296 A * | 1/1991 | Brown ................ G11B 5/5556 360/77.03 |
| 5,140,289 A | 8/1992 | Andrieu et al. |
| 6,246,810 B1 | 6/2001 | Harris et al. |
| 7,357,741 B2 * | 4/2008 | Evans ...................... F16H 7/02 348/368 |
| 7,792,400 B1 | 9/2010 | Zhang et al. |
| 2005/0069249 A1 | 3/2005 | Lo et al. |
| 2010/0040379 A1 | 2/2010 | Kragl et al. |
| 2011/0206319 A1 * | 8/2011 | Krumme ................ H01G 5/01 385/26 |
| 2013/0243375 A1 | 9/2013 | Poisel et al. |
| 2014/0126860 A1 | 5/2014 | Makovets |
| 2014/0264979 A1 * | 9/2014 | Park ................ B29D 11/00644 264/1.34 |
| 2015/0316726 A1 | 11/2015 | Poisel et al. |

FOREIGN PATENT DOCUMENTS

| | | |
|---|---|---|
| DE | 21 2012 000 112 U1 | 3/2014 |
| DE | 10 2012 021 453 B4 | 5/2015 |
| JP | S58215613 A | 12/1983 |
| JP | 2002048936 A | 2/2002 |

* cited by examiner

OPTICAL ROTARY JOINT, METHOD FOR OPTICAL SIGNAL TRANSMISSION AND USE OF THE OPTICAL ROTARY JOINT

CROSS REFERENCE TO RELATED APPLICATIONS

Reference is made to PCT/EP2017/065621 filed Jun. 26, 2017, and German Application No. 10 2016 211 475.1 filed Jun. 27, 2016, which are incorporated herein by reference in their entirety.

BACKGROUND OF THE INVENTION

Technical Field

The invention relates to an optical rotary joint for optical signal transmission having at least two units which are respectively rotatably mounted about an axis of rotation with the axes of rotation being laterally spaced from each other. Further the invention relates to a method for optical signal transmission between two units rotating relative to each other.

Description of the Prior Art

Generic arrangements for the transmission of optical signals between two units rotatably mounted relative to each other are known in many different configurations and are used for the purpose of unidirectional or bidirectional signal transmission. Optical rotary joints are increasingly preferred in comparison to rotary joints usually based on slip ring contacts because of their no-maintenance and no-wear characteristics. Also optical rotary joints are capable of realizing high transmission rates of 40 Gbit/s and more with a high degree of reliability.

Simple optical rotary joints comprise two units rotatably mounted about a common axis of rotation. Each unit has a light conductor oriented lengthwise in relation to the axis of rotation with ends of the light conductor are opposite to each other along the axis of rotation with a limited gap via which optical signal transmission takes place. In order to achieve an optical signal transmission which is loss-free as far as possible, a lens is attached at the end of both light conductors. Rotary joints of this kind are also known as linear optical rotary joints and are capable of transmitting light signals along a light spreading channel in a unidirectional or bidirectional manner.

In order to facilitate optical multi-channel transmission, constructional extensions can be fitted to the above-explained linear optical single-channel rotary joint. Ring-shaped light conductor arrays are arranged concentrically around the light conductors arranged along the axis of rotation with flat ring-shaped faces being described opposite each other to respectively axially overlap along the gap. Such an arrangement has been described in U.S. Pat. No. 4,027,945.

Moreover a plurality of optical rotary joints is known, which provide an optical coupling between two units rotatably mounted relative to each other with more than one optical transmission channel, aided by a suitably arranged reflecting and/or refractive optical elements being comprised to be positioned along individual light-conducting paths intended for the transmission to ensure an interruption-free optical signal transmission. Examples are known from the following patents: U.S. Pat. No. 5,140,289, DE 21 2012 000 112 U1, and U.S. Pat. No. 7,792,400.

In contrast to the above-described optical rotary joints there exist optical rotary joints which are designed with a hollow shaft and include two units rotating relative to each other, which comprise an inner, usually freely accessible internal space/internal through-passage. In this context reference should be made to the publication DE 10 2006 054 052 A1, which describes an optical rotary joint with two units rotatably mounted relative to each other about the hollow shaft, wherein light transmission takes place via at least one light-transparent hollow-cylinder-shaped hollow body with light being coupled in or out via their respectively axially matching opposing annular faces.

The publication DE 10 2010 036 174 A1 describes an optical rotary joint between two units rotatably mounted relative to one another along a common axis of rotation. Both units enclose an internal freely accessible hollow space in the longitudinal direction of the optical axis. To facilitate light transmission, both units comprise a plurality of optical fibers or optical fiber bundles ending at their faces along a circle line and being provided with optical collimators at their ends. Both units are coaxially arranged about the axis of rotation such that the optical collimators respectively arranged along the circle line are axially spaced apart directly opposite each other.

In addition to the above optical rotary joint, the optical rotary transformer described in the DE 10 2012 021 453 B4, provides a so-called fiber mirror between the units rotatably mounted relative to each other, which is for example explained in detail in U.S. Pat. No. 4,943,137.

A further alternative optical signal transmission between two ring-shaped units rotatably mounted coaxially to each other is described in U.S. Pat. No. 4,711,516, in which an optical rotary joint has been disclosed, which comprises two light-transparent ring structures of rectangular annular cross-section, which when axially opposing each other enclose an annular gap, which is filled with a refractive-index-adapting fluid. Optical signal transmission between the two opposing and rotatably mounted ring structures takes place via the fluid-filled gap.

Finally, U.S. Pat. No. 6,246,810 discloses an optical rotary joint with an annularly shaped optical fiber, which has an optical fiber end shaped as a light chasm with a light detector arranged at the opposite optical fiber end thereof. A light source is moved along the annular trajectory of the optical fiber for coupling in light. The light source and optical fiber are each integrated in separate units which are rotatably mounted relative to each other.

Where it is the objective to design optical rotary joints for optical signal transmission between two large rotatably mounted units, a great deal of technical constructive and cost-related expenditure is required for realizing such an optical rotary joint based on the previously known coupling concepts, particularly because the optical elements involved in the optical signal transmission must respectively be of large dimensions. It is therefore desirable to search for an innovative optical coupling concept which despite random system scalability does not require or requires only very little significant technical, material and cost-specific additional expenditure with respect to the components involved in the optical signal transmission. The innovative optical rotary joint should be very reliable in operation and be able to realise data transmission rates of 40 GBit/s and more. The optical rotary joint, in a particularly advantageous manner, shall serve an optical signal transmission between two units, with at least one unit being designed as a hollow shaft with an open inner through-passage.

SUMMARY OF THE INVENTION

In contrast to the known optical rotary joints, the rotary according to the invention comprises at least two units rotatably mounted relative to each other, respectively, about an axis of rotation with the axes of rotation comprising, at least in sections, to be laterally spaced from each other. "Laterally spaced" and lateral distance is understood to mean that both axes of rotation comprise a defined distance≠0 in transverse direction thereof. Not necessarily, but advantageously, both axes of rotation are oriented in parallel to each other. It is also feasible, however, to arrange the axes of rotation so that they intersect with each other at one point, wherein, in this case, the axes of rotation, with the exception of the common point of intersection, are also laterally spaced apart from each other.

Both units which are rotatably mounted respectively about an axis of rotation are positively coupled to each other in a rotationally movable manner via a rotary transformer designed in the form of an endless loop, wherein the rotary transformer is in contact with both units along a contact region.

An optical unit is non-rotatably attached to each of the units, so that it is rotated together with the units. The optical unit comprises at least: at least one optical signal line, at least one of a beam splitter and beam coupler, which is optically coupled to the at least one optical signal line. As the two embodiments show, the optical signal line on one of the two units is directly or indirectly connected to a light source emitting the optical signals, and the optical signal line which is non-rotatably attached to the other unit is directly or indirectly optically coupled to a corresponding optical light detector.

Further at least two optical transmission lines are attached alongside the rotary transformer. For the purpose of optical signal transmission from the one rotatably mounted unit to the other rotatably mounted unit via the optical transmission lines attached to the rotary transformer, optical coupling means are attached both on the rotary transformer and on both rotatably mounted units and are configured such that a detachable optical signal coupling is simultaneous at the location of both units between one of the partial signal lines and one of the optical transmission lines. In this way optical signals can be transmitted without interruption between the two units either via at least one of the first and the second optical signal line.

With a first variant, the rotatably mounted units each comprise a peripheral edge which is configured such that the rotary transformer forms at least one of a torque-proof detachable force-locking and form-locking connection with the rotatably mounted units along the respective contact region which revolves around both units while being having applied clamping force. The clamping force along the rotary transformer can be optionally controlled by at least one guide pulley or clamping device additionally making peripheral contact with the rotary transformer.

Preferably, the peripheral edges of the rotatably mounted units are circularly shaped and thus each have a circular diameter. Both circular diameters are not necessarily identical and may be different from each other.

The rotary transformer is preferably configured as a V-belt, a bolt or roller chain. The length of the rotary transformer advantageously corresponds to the total length of both contact regions, which in turn are preferably dimensioned to be of the same length, plus twice the distance of both axes of rotation in the case of two axes of rotation arranged in parallel. Four optical coupling means are attached at equal distances each other along the rotary transformer. The coupling means are each connected at their ends to the two optical transmission lines. The optical coupling means are attached to the rotatably mounted units at the ends thereof respectively to the two optical partial signal lines, which are diametrically located opposite to each other along the peripheral edge for each rotatably mounted unit.

The rotary transformer preferably is configured as a chain which is in operative connection with the peripheral edges of both rotatably mounted units such that it is always ensured that while the rotary transformer revolves around both rotatably mounted units, the optical couplings respectively attached to the rotary transformer are in a repeating sequence with the optical coupling means attached to the rotatably mounted units, to be positioned directly opposite to each other insofar as they are within a contact region.

Due to preferably identical dimensions regarding shape and size of both rotatably mounted units including their associated contact regions, optical signal coupling is effected such that during a first half revolution of the rotary transformer around both rotatably mounted units, an optical signal transmission takes place along a first optical transmission line with the associated coupling being optically coupled to the coupling on the side of the rotatably mounted units while revolving within the contact region. At the beginning of the second half revolution of the rotary transformer around both rotatably mounted units, the coupling means optically coupled during the first revolution are dynamically decoupled, and at the same time optical coupling of the remaining coupling means takes place for optical signal transmission along the second optical transmission line, which is similarly to the first one being attached to the rotary transformer for joint rotation.

Advantageously the contact regions along both rotatably mounted units are each dimensioned respectively larger than a fourth of the length of the rotary transformer so that optical signal transmission can take place in an overlapping manner briefly across both optical transmission lines attached to the rotary transformer.

It is of course possible, both for reasons of secure optical signal transmission and for reasons of multi-channel transmission, to provide more than two optical transmission lines along the rotary transformer. Similarly, it is possible to provide at least one of optical transmission lines and a optical partial signal lines positioned on each of the rotatably mounted units. In such a case, a number n of optical couplings must be attached along the rotary transformer, which corresponds to the sum of the number of optical couplings attached to the at least two rotatably mounted units. Also in such a case, the optical couplings attached to the rotatably mounted unit must be evenly distributed about the axis of rotation associated with the respective unit.

Configuring the optical couplings attached to both the rotary transformer and the rotatably mounted units can be accomplished in many different ways. With one preferred variant, the optical couplings are attached to the rotary transformer to provide imaging optics respectively, preferably are an optical collimator, which is attached and enclosed in a housing at the end of the optical transmission line. In contrast, the optical couplings attached to the rotatably mounted units provide for imaging optics, which are attached, enclosed in a housing, to the end of the partial signal lines, plus for an additional attachment means for forming a detachable joint with the housed imaging optics attached to the rotary transformer. The attachment means may for example be designed as a clamp, snap-in or plug-in connection, which ensures a reliable detachable joint of both housed imaging optics and a defined specified coaxial alignment with each other. The attachment is preferably of purely mechanical design, ensuring on the one hand a reliable joint between respectively the two imaging optics as soon as these are alongside the joining region, and on the other hand allowing the joint to be separated without any damage, as soon as the coupling means and the imaging optics are not positioned in the contact area due to the revolving movement of the rotary transformer between the two rotatably mounted units.

When an optical signal is to be transmitted between a rotating unit and a stationary unit, a preferred embodiment of the optical rotary joint according to the additionally provides for a linear optical rotary joint, which is attached along the axis of rotation of one of the two units, alongside which the optical transmission line is non-rotatably attached to one of the rotatably mounted units and is arranged to be aligned and optically coupled on one side to the linear optical rotary joint. Further details in this respect are revealed in the description to the illustrated embodiment.

With a further preferred embodiment, one of the two rotatably mounted units is a hollow shaft, which has a freely accessible inner region radially surrounded by the hollow shaft. An optical rotary joint configured in this way according to the invention is particularly suitable for use in medical diagnostic devices such as magnetic resonance/nuclear spin apparatuses or computer tomography scanners. Further such annularly shaped optical rotary joints can be used for measuring and analysis layouts for performing non-destructive tests on any given objects.

All of the above feature-related embodiments may be randomly combined with each other.

The optical rotary joint according to the invention can be randomly scaled and does not, even with large-scale rotatably mounted units, require major additional expenditure regarding additional components required for optical signal transmission. The optical transmission lines attached along the rotary transformer may have to be of sufficiently long dimensions. The advantage of the invention is in particular that the technical expenditure can be kept comparatively small for optical signal transmission between a large-scale rotatably mounted unit with free internal space, such as in the case of a computer tomography scanner in which the tube may be dimensioned to be several meters long, or a rotatably mounted unit of smaller diameter having a closed structure, to which a conventional linear optical rotary joint can be attached along the axis of rotation, in order to ultimately realize an optical signal transmission to an external stationary system.

The concept on which the optical rotary joint according to the invention is based, is characterised by having at least two identical optical signals on one of the two rotatably mounted units being generated from one optical signal to be transmitted, which are transmitted along the rotary transformer in temporal sequence to the respectively other unit of the two units, on which the at least one optically transmitted signal is forwarded by an optical signal coupling along an optical signal line, for example directly or indirectly to a detector. The temporal sequence of the signal transmission of the at least two optical signals is effected along the rotary transformer between the two units without a time gap, preferably with a time-related overlap.

For the purposes of optical signal transmission along the rotary transformer two separate optical transmission lines are attached respectively alongside the rotary transformer. An optical transmission signal is transmitted by each optical transmission line. During the first half of one complete revolution of the rotary transformer around both rotatably mounted units, one of the two transmission lines transmits one of the two optical signals and during the second half of the complete revolution of the rotary transformer the other of the two transmission lines transmits the other of the two optical signals.

Naturally, an optical signal to be transmitted by use of an optical transmission is broken down into more than two partial signals each of which would be separately transmitted via optical transmission lines provided alongside the rotary transformer. Further, it is feasible and possible to transmit more than two signals by using the optical rotary joint designed according to the invention. To this end, two or more optical signal lines must be non-rotatably attached to one of the two rotatably mounted units, which are coupled to respectively to different information light sources. In order to split an optical signal, each of the optical signal lines is coupled to an optical beam splitter, from which at least two optical signals are emitted. Signal transmission is performed in the same way as previously described, for each transmission channel.

Construction of the rotary transformer can be carried out in many different ways, as long as the basic function of necessary kinematic coupling of the at least two rotatably mounted units is available. It is feasible to design the rotary transformer in the form of a light-conducting line, which realizes both the necessary kinematic coupling between the two rotatably mounted units and optical signal transmission.

The optical rotary joint according to the invention allows for a possibility of transmitting optical signals between three or more respectively rotatably mounted units. It can be possible, for example, to provide a third rotatably mounted unit around which the rotary transformer revolves additionally along a contact region. The third rotatably mounted unit is designed with a correspondingly fashioned optical unit in the same way as the two optical units attached to the two units described.

The invention can thus, in principle, be extended to optical signal transmission between a plurality of respectively rotatably mounted units with axes of rotation arranged at a lateral distance from each other, which are all positively coupled to each other in a rotary fashion via a rotary transformer.

BRIEF DESCRIPTION OF THE INVENTION

The invention will now be described without any restriction to the general inventive idea by way of exemplary embodiments with reference to the drawings in which.

DETAILED DESCRIPTION OF THE INVENTION

Figure 1:
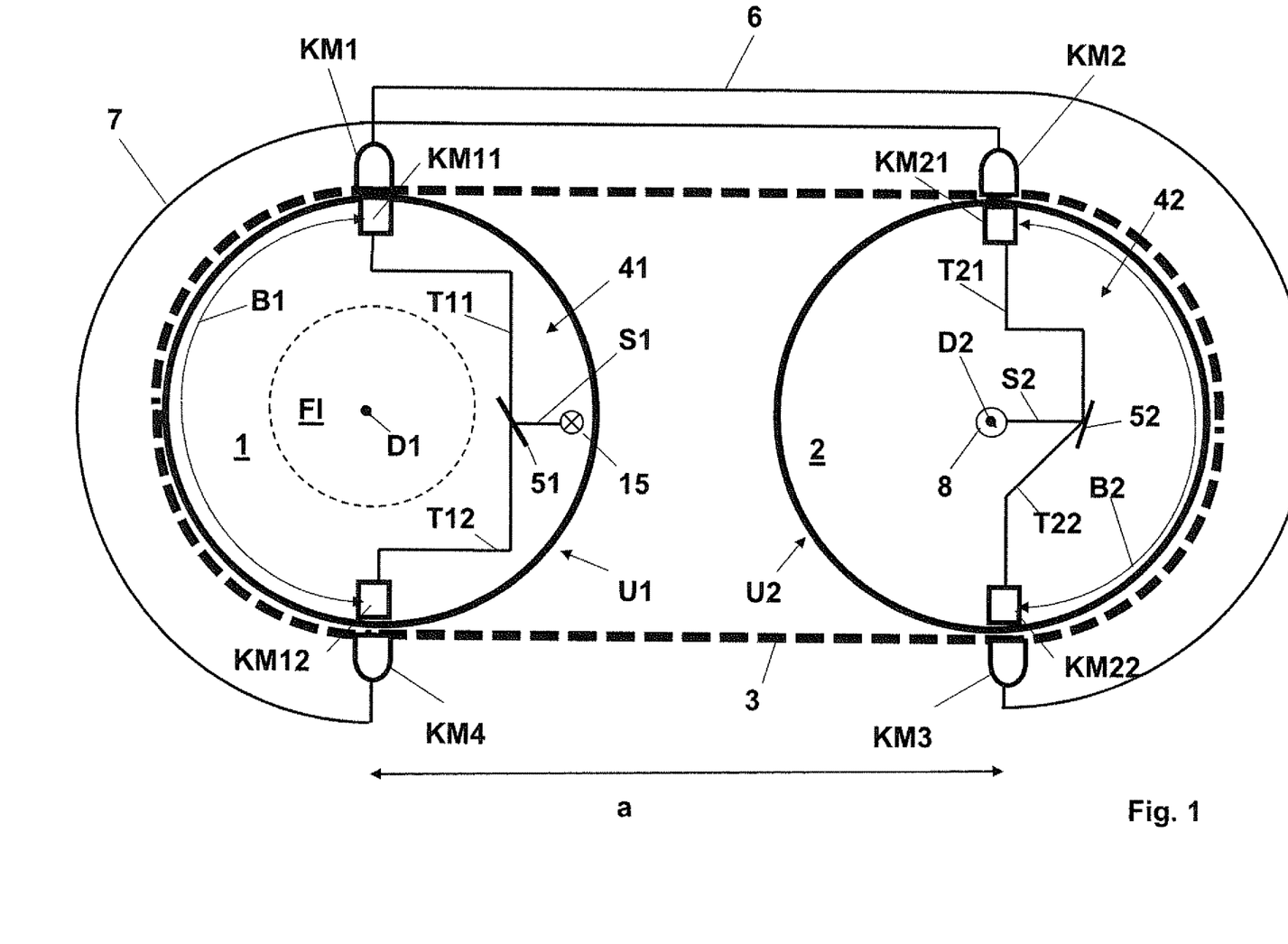
FIG. 1 schematically shows an optical rotary joint designed according to the invention.

FIG. 1 shows a schematic view of an optical rotary joint for optical signal transmission between two units rotatably mounted about an axes of rotation D1 and D1, respectively. Both rotatably mounted units 1, 2 are kinematically positively coupled between a rotary transformer 3, that is the rotary transformer 3, preferably in the form of a V-belt, tooth-belt, bolt or roller chain, which is in revolving contact with both rotatably mounted units 1, 2 positioned along, respectively, an at least semi-circularly-shaped contact regions B1, B2 thereby forming at least one of a form-lock and a friction-lock. The axes of rotation of both units 1, 2 are spaced apart from each other by a lateral distance a, and are oriented in parallel.

Optical signal transmission between the two rotatably mounted units 1, 2 is accomplished by the two units 1, 2 having an optical unit 41, 42 each non-rotatably attached to them. Both units comprise the following optical components: an optical signal line S1, S2 along which an optical signal is supplied/discharged. Each optical signal line S1, S2 is optically coupled to a beam splitter/beam coupler 51, 52. The beam splitter/beam coupler 51, 52 has respectively two optical partial signal lines T11, T12, T21, T22 optically coupled to it. The ends of the optical partial signal lines T11, T12, T21, T22 are optically connected to optical couplings KM11, KM12, KM21, KM22. Advantageously the optical coupling means KM11, KM12, KM21, KM22 are attached to the ends of the partial signal lines T11, T12, T21, T22 and are configured as housed optical imaging optics, which are non-rotatably attached to or close to the peripheral edge U1, U2 of the respective optical unit 1, 2. As revealed in FIG. 1, the optical couplings KM11, KM12, KM21, KM22 on the rotatably mounted units 1, 2 are each arranged diametrically opposite to the axis of rotation D1, D2.

For the purpose of optical signal transmission from the first to the second rotatably mounted unit 1, 2, four optical coupling means KM1, KM2, KM3, KM4 are attached along the chain-type rotary transformer 3 with the distances along the rotary transformer 3 are chosen to be equidistant. Two optical transmission lines are attached, and non-rotatably connected to, along the rotary transformer 3, of which the first transmission line 6 connects the optical couplings KM1 and KM3 to be fixedly connected to the rotary transformer 3 and of which the second optical transmission line 7 connects the optical coupling means KM2 and KM4 optically together.

The geometrical distances between the optical couplings KM1, KM2, KM3, KM4 attached to the rotary transformer 3, the length of the rotary transformer 3 as well as the dimensions of the peripheral edges U1, U2 and the contact regions B1, B2 are adjusted relative to each other such that for the purpose of continual optical signal transmission between the two rotatably mounted units 1, 2, it is always ensured that for one complete revolution of the rotary transformer 3 about both rotatably mounted units 1, 2, optical signal transmission takes place along at least one of the two optical transmission lines 6, 7. In this way uninterrupted transmission of optical signals over two spatially separate transmission channels is realized, wherein the optical signals are transmitted in periodical sequence over the first and the second transmission line.

In the situation shown in FIG. 1, where it is assumed that the rotary transformer 3 revolves clockwise about both rotatably mounted units 1, 2, (see depiction of arrow), the coupling means KM4 optically couples to the coupling means KM12 attached to the first rotatably mounted unit 1, at the same time the coupling means KM2 optically couples to the coupling means KM21 non-rotatably attached to the second rotatably mounted unit 2, so that optical signal transmission is established between the two rotatably mounted units 1, 2. When the coupling means KM4, KM12 associated with the second optical transmission line 7 as well as KM2, KM21 move out of the respective contact regions B1, B2, the optical coupling means KM1, KM11 associated with the first optical transmission line 6 as well as KM3, KM12 couple to each other, so that optical signal transmission now takes place over the first optical transmission line 6.

Assuming that the first optical signal line S1 of the first rotatably mounted unit 1 is connected to an optical signal source 15, the optical signals are continually transmitted to the second rotatably mounted unit 2. The optical signal present along the optical signal line 2 is split via an optical beam splitter 51 into two identical partial signals which are respectively forwarded along the optical partial signal line T11 and T12. In the case shown in FIG. 1, the optical signal is initially, via the second partial signal line T12 via the coupling means KM12 as well as KM4, coupled into the second optical transmission line 7 extending along the rotary transformer 3, via which the optical signal, via the coupling means KM2 and KM21 optically coupling with each other along the contact region B2 of the second rotatably mounted unit 2, arrives at the optical signal line S2 at the location of the second rotatably mounted unit 2 along the partial signal line 21 via the beam splitter 52. Let it further be assumed that a basically known linear optical rotary joint 8 is provided along the second axis of rotation D2, which transmits the optical signal being transmitted along the optical signal line S2 co-rotating with the second rotatably mounted unit 2, to an external stationary unit (not shown). To this end the optical signal line S2 couples, along the axis of rotation D2, to a part co-rotating with the second unit 2, of the linear optical rotary joint 8, which transmits the optical signal to a stationary part of the rotary joint in a conventional way.

As soon as optical signal transmission along the second optical transmission line 7 is interrupted by separating the respective couplings KM12, KM4 as well as KM2, KM12 as a result of the rotary transformer's 3 revolving movement about both rotatably mounted units 1, 2, optical signal transmission is performed without interruption via the first optical transmission line 6. During this process the optical partial signal spreading along the first partial signal line T11 is coupled via the coupling means KM11 and KM1 into the first optical transmission line 6, via which signal transmission is effected to the coupling means KM3 and KM22 and subsequently via the optical partial signal line T22 and the beam coupler 52 into the optical signal line S2 of the second rotatably mounted unit 2.

Due to appropriate dimensioning, in particular the length of the contact regions B1, B2, the coupling events between the coupling means KM1, KM2, KM3, KM4 laterally attached to the rotary transformer 3 and the coupling means KM11, KM12, KM21, KM22 attached to the rotatably mounted units 1, 2 can be adjusted relative to each other such that the coupling events for signal transmission temporally overlap along the first and second optical transmission line 6, 7.

Due to the laterally offset arrangement of the two rotatably mounted units 1, 2 towards each other, it is possible, in an advantageous manner, to configure the rotatably mounted unit 1 shown in FIG. 1 as a hollow body for example, which annularly encloses a freely accessible internal space FI.

Thus, the optical signal transmission concept according to the invention is suitable preferably for operating annularly shaped analysis and investigative units for use for example in nuclear spin and computer tomography scanners.

Figure 2:
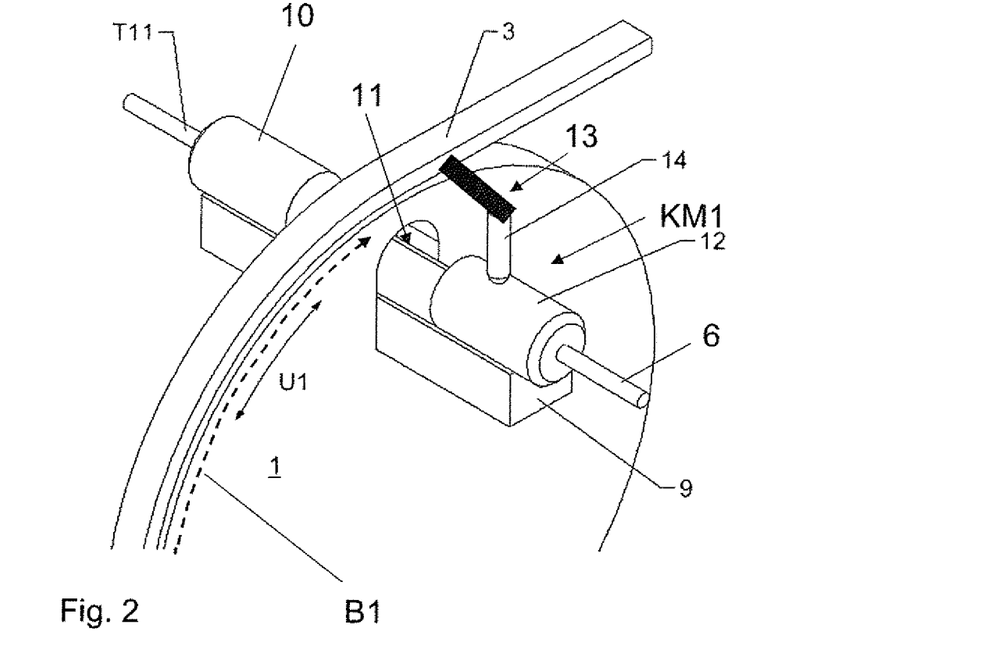
FIG. 2 shows a mechanism for a detachable optical signal coupling between a partial signal line and one of the optical transmission lines.

FIG. 2 shows a perspective view of an implementation for the optical coupling between a partial signal line T11 which is non-rotatably attached to a rotatably mounted unit 1 and an optical coupling means KM1 which is fixedly mounted on the rotary transformer 3.

The rotatably mounted unit 1 to this end comprises on its peripheral edge U1 a preferably chain-tooth-shaped or groove-shaped structure into which the rotary transformer 3 engages in the manner of a chain-belt or V-belt and of which for reasons of better clarity only a short portion is shown.

Figure 3:
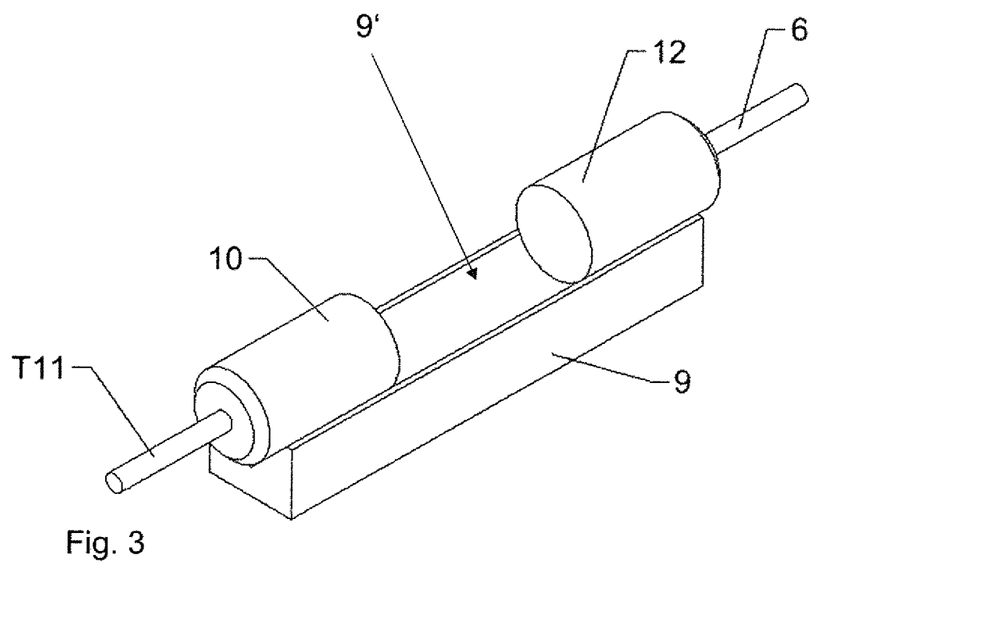
FIG. 3 shows a view of housing including imaging optics attached to the end of a partial signal line as well as an optical transmission line.

The rotatably mounted unit 1 has an attachment 9 fixed to it as seen also in FIG. 3, which firmly forms a housed imaging optics 10 which is attached to the optical signal line T11 at the end. The imaging optics 10 allows optimized coupling-in and coupling-out of light into/out of the optical partial signal line T11. The rotatably mounted unit 1 also comprises a bore 11 which is coaxially aligned with the aperture of the imaging optics 10. Moreover, the attachment means 9 comprises a groove-shaped reception area 9' for accepting a loosely placed housed imaging optics 12 attached to the end of the first transmission line 6, so that the apertures of both imaging optics 10 and 12, lying axially opposite each other, can be brought into contact.

The housed imaging optics 12 attached to the end of the first transmission line 6 is fixedly attached alongside and co-moves with, the rotary transformer 3 via a preferably spring-loaded elastic holding means 13. The coupling means KM1 surrounding the holding means 13 and the housed imaging optics 12 is thus firmly associated with the rotary transformer 3 revolving with the same around the rotatably mounted units 1, 2.

As soon as the coupling means KM1 reaches the contact region B1 which is the broken line in FIG. 3, of the rotatably mounted unit 1, the housed imaging optics 12 slides into contact with the grooved-shaped reception area 9' of the attachment means 9. An additional clamping mechanism 14 which is attached to the rotatably mounted unit 1, ensures that the housed imaging optics 12 is additionally pressed and secured by the clamping force into the grooved-shaped reception area 9' so that an exactly coaxial alignment of both imaging optics 10, 11 is ensured.

As soon as the optical coupling situation depicted in FIG. 2 changes due to further rotation, with the contact region B1 left behind, the clamping mechanism 14 opens and the coupling means 1 guided by the rotary transformer 3 slides without power out of the groove-shaped reception area 9' of the attachment means 9.

The coupling mechanism illustrated in FIG. 2 is configured identically in all four coupling regions.

Figure 4:
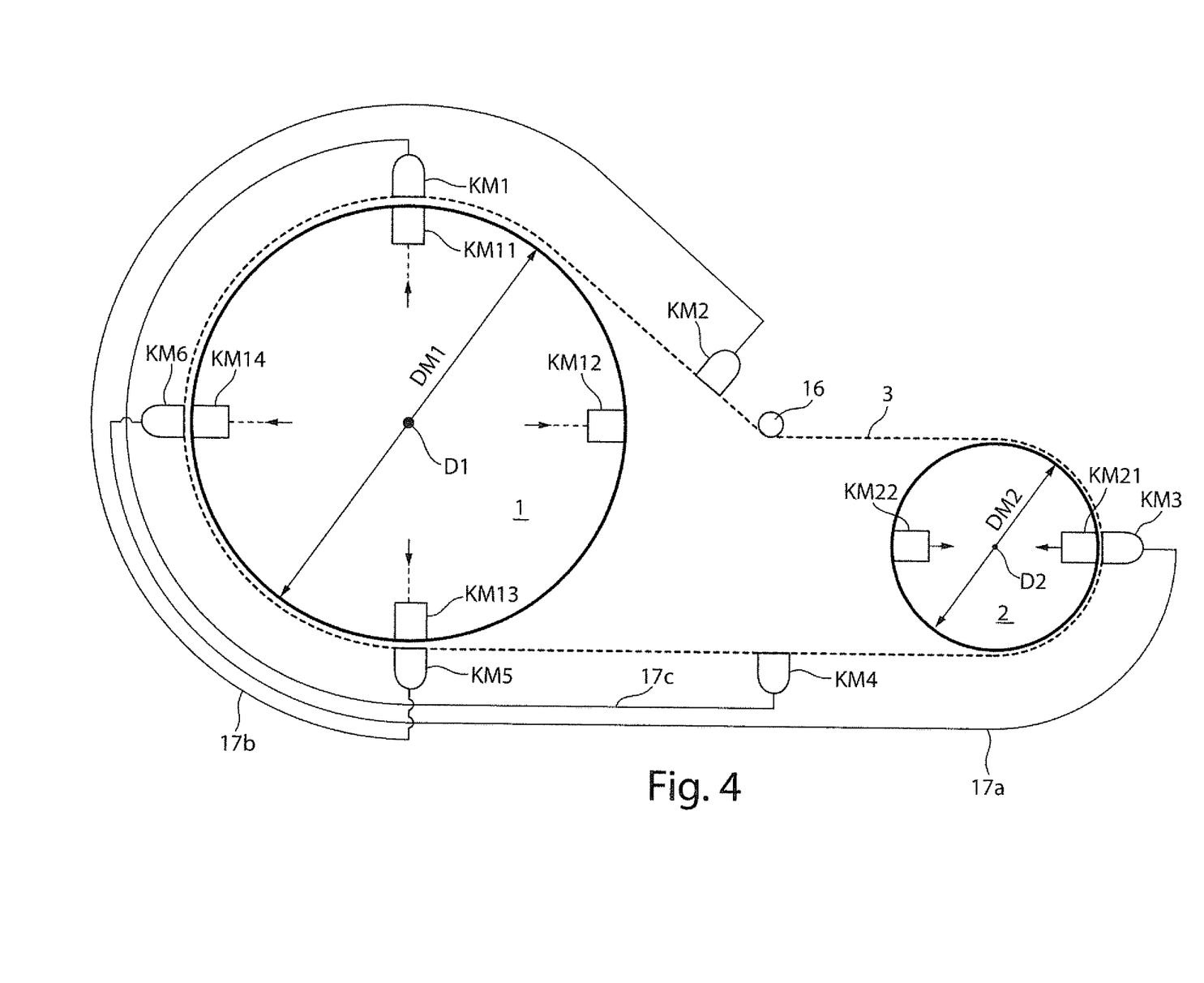
FIG. 4 shows a schematic structure of an optical rotary joint designed according to the invention with differently dimensioned rotary units.

FIG. 4 shows a schematic view of an embodiment of the optical rotary joint according to the invention, which comprises two differently dimensioned units 1, 2 each rotatably mounted about an axis of rotation D1, D2. For reasons of better clarity, the drawing does not show the optical units for generating and forwarding the optical signals on the rotatably mounted units 1, 2, respectively. In the same way as with the embodiment shown in FIG. 2, it is assumed that the rotatably mounted unit 1 with the larger diameter has a co-rotating optical signal source attached to it, from where the optical signal is transmitted simultaneously via respective optical partial signal lines to all four optical coupling means KM11, KM12, KM13, KM14 attached to the rotatably mounted unit 1. The four optical coupling means KM11, KM12, KM13, and KM14, which are attached to the rotatably mounted unit 1, are arranged equidistantly along the peripheral edge of the rotatably mounted unit 1. The rotatably mounted unit 2 of smaller dimension comprises a diameter DM2, which is half the size of the diameter DM1 of the rotatably mounted unit 1. The rotatably mounted unit 2 of smaller dimension comprises two optical coupling means KM21, KM22, arranged diametrically opposite each other, which are connected via optical signal lines (not shown) with a linear optical rotary joint, as in the case of FIG. 1.

Six optical couplings means KM1, KM2, KM3, KM4, KM5, KM6 equidistantly spaced apart from each other are attached alongside the rotary transformer 3 in the form of an endless loop.

In order to ensure that the rotary transformer 3 is in contact in particular with the rotatably mounted unit 2 of smaller dimension at least along a semi-circularly shaped contact region at the peripheral edge thereof, a clamp 16 is provided, for example in the form of a small guide pulley, over which the rotary transformer 3 is guided and subjected to a clamping force.

Let it be assumed that both rotatably mounted units 1, 2 rotate clockwise. In the constellation shown in FIG. 4, optical signal transmission from the first unit 1 to the second unit 2 is affected via the optical transmission line 17a, which optically connects the optical couplings KM3 and KM6 attached to the rotary transformer 3 with each other. Both optical couplings KM3 and KM6 attached to the rotary transformer 3 are optically coupled to the optical couplings KM21 and KM14 attached respectively to the rotatably mounted units 1, 2.

As soon as optical signal transmission over the above-described optical transmission path is disconnected as a result of rotation, the optical couplings KM2 and KM5 attached to the rotary transformer simultaneously get into optical contact with the optical coupling means KM22 and KM13 attached, respectively, to the rotatably mounted units 1, 2. When this transmission line also is disconnected as a result of rotation, further optical signal transmission is seamlessly effected via the optical transmission line 17c attached to the rotary transformer 3, which connects the coupling means KM1 and KM14 with each other. The arrangement schematically shown in FIG. 4 shall demonstrate the possibility that it is possible to achieve optical transmission between two rotatably mounted units 1, 2 with differently dimensioned diameters DM1 and DM2.

LIST OF REFERENCE SYMBOLS 1, 2 rotatably mounted units
3 Rotary transformer
41, 42 Optical unit
51, 52 Beam coupler, beam splitter
6, 7 Optical transmission line
8 Linear optical rotary joint
9 Freely accessible internal space
10 Imaging optics
11 Bore
12 Imaging optics
13 Carrier designed as a leaf spring
14 Clamping mechanism
15 Optical signal source
16 Clamp
17a, b, c Optical transmission line
KM1, KM2, KM3, KM4, couplings attached on the side of the KM5, KM6 rotary transformer
KM11, KM12, KM13, Couplings attached to the rotatably KM14, KM21, KM22 mounted unit
D1, D2 Axes of rotation
a Lateral distance
S1, S2 Optical signal line
T11, T12, T21, T22 Optical partial signal line
B1, B2 Contact region
FI Freely accessible internal space

The invention claimed is:

1. An optical rotary joint comprising:
    units which are mounted, respectively, to individually rotate about different axes of rotation, each axis of rotation including sections spaced a distance from each other, a rotary transformer configured in an endless loop which contacts the units respectively along a different contact region and, which positively couples the units to rotate;
    optical units, each optical unit being non-rotationally fixed to a different unit, each optical unit comprising at least one optical signal line, at least one of a beam splitter and beam coupler, which is optically coupled to the at least one optical signal line, and to at least two optical partial signal lines, which are optically coupled with at least one of the beam splitter and the beam coupler to the at least one optical signal line; and
    at least two optical transmission lines, attached to the rotary transformer and to the optical couplings to other optical couplings whereby optical signal coupling is provided between one of the partial signal lines and one of the optical transmission lines.

2. The optical rotary joint according to claim 1, wherein the axes of rotation are oriented in parallel to each other.

3. The optical rotary joint according to claim 1, wherein one of the units comprises a hollow shaft, including an open internal area which is surrounded by the hollow shaft.

4. The optical rotary joint according to claim 1, wherein the optical signal line of at least one of the units, includes sections, located along the axis of rotation associated with the at least one of the units; and
    a linear optical rotary joint is located along the axis of rotation associated with the at least one of the units and connected with the optical signal lines.

5. The optical rotary joint according to claim 1, wherein the units each comprise a peripheral edge formed so that the rotary transformer comprises at least one of a non-rotatable and detachable lock and a force lock connection with the peripheral edge and revolves around the units while a clamping force is applied by the rotary transformer to the units.

6. The optical rotary joint according to claim 1, wherein the rotary transformer comprises one of a V-belt, a bolt-chain or a roller-chain.

7. The optical rotary joint according to claim 1, wherein the optical coupling attached to the rotary transformer and to the optical coupling attached to the units is configured so that for one complete revolution of the rotary transformer around the units at least one optical signal coupling is within the contact area of the at least two units, by which optical signal transmission occurs between the units.

8. The optical rotary joint according to claim 1, wherein the optical couplings attached to the rotary transformer each comprise:
    housed imaging optics attached to an end of the optical transmission line; and
    the optical couplings attached to the rotatably mounted units each comprise housed imaging optics attached to an end the partial signal lines and an attachment for detachably joining a housed imaging optics attached to the rotary transformer.

9. The optical rotary joint according to claim 1, comprising:
    n optical couplings are attached along the rotary transformer, which correspond to a sum of the n optical couplings attached to the units; and wherein
    the optical couplings attached to the units are evenly distributed around the axis of rotation associated with the unit.

10. The optical rotary joint according to claim 9, wherein the optical signal lines are optically coupled to an end of at least one optical signal source or an optical signal detector.

11. The optical rotary joint according to claim 1, comprising
    contact regions which each are part of a circular circumference, each are associated with a circular diameter, and
    circular diameters of the units are different from one another.

12. A use of the optical rotary joint in accordance with claim 1 comprising: providing optical signal transmission with the optical rotary joint in a computer tomography scanner.

* * * * *